(12) United States Patent
Ruhlen (10) Patent No.: US 8,108,441 B2
(45) Date of Patent: Jan. 31, 2012

(54) EFFICIENT CREATION, STORAGE, AND PROVISION OF WEB-VIEWABLE DOCUMENTS

(75) Inventor: Matthew J. Ruhlen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 317 days.

(21) Appl. No.: 12/427,552

(22) Filed: Apr. 21, 2009

(65) Prior Publication Data

US 2010/0268736 A1    Oct. 21, 2010

(51) Int. Cl.
G06F 17/30 (2006.01)
G06F 12/00 (2006.01)
(52) U.S. Cl. ........................ 707/802; 707/755
(58) Field of Classification Search .................. 707/802, 707/755
See application file for complete search history.

(56) References Cited

U.S. PATENT DOCUMENTS

| | | | |
|---|---|---|---|
| 6,591,272 B1 | 7/2003 | Williams | 707/102 |
| 6,898,603 B1 | 5/2005 | Petculescu et al. | 707/101 |
| 7,139,811 B2 | 11/2006 | Lev Ran et al. | 709/217 |
| 7,165,101 B2 | 1/2007 | Daniels et al. | 709/223 |
| 2003/0037041 A1* | 2/2003 | Hertz | 707/1 |
| 2005/0273849 A1 | 12/2005 | Araujo et al. | 726/12 |
| 2008/0229024 A1 | 9/2008 | Plamondon | 711/126 |
| 2009/0037514 A1* | 2/2009 | Lankford et al. | 709/201 |
| 2010/0268736 A1* | 10/2010 | Ruhlen | 707/770 |

OTHER PUBLICATIONS

Kaushik, Avneesh; "How to Optimize a SharePoint Server 2007 Web Content Management Site for Performance;" MSDN; Sep. 2007; 14 pp.
No Author; "Improve Web Application Performance;" downloaded from the internet on Feb. 10, 2009; 6 pp; URL: http://www.ajaxlines.com/ajax/stuff/article/improve_web_application_performance.php.
Davison, Brian D.; "A Web Caching Primer;" Rutgers, The State University of New Jersey; IEEE Internet Computing, vol. 5, No. 4, Jul./Aug. 2001, pp. 38-45.
Fisher; Darin et al.; "Link Prefetching in Mozilla: A Server-Driven Approach;" 2003; 6 pp.

\* cited by examiner

*Primary Examiner* — Kuen Lu
(74) *Attorney, Agent, or Firm* — Merchant & Gould PC (57) ABSTRACT

A system and method are disclosed for providing a resource, such as a document, to a client computing device. A request is received at a server from the client for particular named objects representing a portion of the document. It is determined that the particular named objects requested are contained in a particular chunk of a bundle. The bundle includes a plurality of named objects that comprise a version of the document that is rendered to be displayable by the client. It is determined that the particular chunk is not stored locally at the server, so the particular chunk is requested and received from bundle storage. The particular chunk, which includes the particular named objects requested and additional named objects, is stored locally by the server. The particular named objects are then sent to the client without sending the additional named objects to the client.

20 Claims, 8 Drawing Sheets

| Name | Starting Offset (Bytes) | Length (Bytes) |
|---|---|---|
| PG0001A | 1,001 | 199,000 |
| PG0001B | 200,001 | 60,000 |
| PG0002A | 260,001 | 100,000 |
| PG0002B | 360,001 | 600,000 |
| PG0002C | 1,000,001 | 400,000 |
| PG0003A | 1,400,001 | 600,000 |

EFFICIENT CREATION, STORAGE, AND PROVISION OF WEB-VIEWABLE DOCUMENTS

BACKGROUND

With the advent of the Internet, computer users have become accustomed to the ability to view documents through a web browser. This is true even if those documents were originally created in a separate native application. For example, documents created in a word processing application, such as Microsoft Word, available from Microsoft Corporation of Redmond, Wash., may be viewable through a web browser operating at a client computing device. Other types of documents, such as spreadsheets, diagrams, images, etc., may also be viewed through a web browser on a client machine. Viewing a document through a web browser may require multiple requests from a browser to web server(s) for each page of a document. Overhead incurred by the web server(s) with respect to satisfying such requests can be considerable.

It is with respect to these and other considerations that embodiments of the present application are presented.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In embodiments, a method is disclosed for providing a document to a browser operating on a client device. The server receives a request for a particular named object representing a portion of the document. The particular named object is part of a bundle. The bundle includes a plurality of named objects, which together make up a version of the document that has been rendered so that it is displayable by the browser. The server determines that the particular named object requested by the browser is contained in a particular chunk of the bundle. When the server determines that the particular chunk of the bundle is not stored locally at the server, the server requests and receives the particular chunk from bundle storage, and the particular chunk is then saved locally. The particular chunk includes not only the particular named object requested by the browser; it also includes additional named objects. The particular named object is then sent to the browser without sending the additional named objects. In embodiments, the server receives another request from the browser, and the request is for a second named object. If the second named object is also contained in a previously retrieved chunk that has previously been stored locally (such as the particular chunk), the second named object is provided to the browser from the server's local storage.

In addition, in embodiments, a system is disclosed for providing a document to a browser on a client device. The system includes a web server that is adapted to both render a document and provide named objects from the rendered version of the document as requested by the browser. The web server renders a document into a version that is displayable by the browser. The rendered version comprises a plurality of named objects. The web server creates a bundle that includes the named objects and a manifest. The manifest describes the relative positions of the named objects within the bundle. The bundle is then sent to bundle storage. In embodiments, the bundle may be stored in chunks of a particular size, wherein the chunks include multiple named objects, and no named objects straddle the boundary between chunks. The web server then determines that a particular named object is contained in a particular chunk of the bundle and checks whether that particular chunk is stored locally at the web server. If not, the particular chunk is requested and received from the bundle storage and stored locally at the web server. The particular named object is then sent to the browser. In embodiments, the manifest is sent to the browser, and the browser requests the particular named object. Included in the browser's request is the relative position of the named object within the bundle. In addition, in embodiments, the system further comprises a load balancing server and a second web server. The first web server sends an identifier of the first web server to the client device. When the client device then requests a second named object, the request includes the identifier, and the load balancing server directs the request back to the first web server.

In addition, in embodiments, a computer storage medium of a client device is provided. The computer storage medium includes instructions that, when executed by at least one processor, cause the processor(s) to request, receive, and display named objects associated with a document. A manifest associated with the document is received, and the manifest describes the relative positions of named objects within a bundle associated with the document. The client device sends a request for a particular named object representing a portion of the document. The request includes the relative position of the particular named object within the bundle. The particular named object is received and displayed at the client device. In embodiments, the client device receives an identifier of a server that provided the particular named object, and the client includes that identifier in a subsequent request for a second named object.

These and other features and advantages will be apparent from a reading of the following detailed description and a review of the associated drawings. It is to be understood that both the foregoing general description and the following detailed description are explanatory only and are not restrictive of the embodiments claimed.

DETAILED DESCRIPTION

In the following detailed description, references are made to the accompanying drawings that form a part hereof, and in which are shown by way of illustrations specific embodiments or examples. These embodiments may be combined, other embodiments may be utilized, and structural changes may be made without departing from the spirit or scope of the present invention. The following detailed description is therefore not to be taken in a limiting sense and the scope of the present invention is defined by the appended claims and their equivalents.

As briefly described above, embodiments disclosed herein are directed to creating, storing, providing, and displaying web-viewable documents. Because the creation of a web-viewable document is resource-intensive, once the web-viewable version of a document is rendered, it is stored for further use. In addition, viewing of a document through a web browser may require multiple requests to a web server from a web browser operating on a client machine. As such, embodiments disclosed herein limit the overhead associated with fulfilling such requests from a web browser. As used herein, a web browser includes a computer software application that permits a user to display and interact with text, images, video, audio, and other content typically located on a web page or web site on the Internet or other network.

In embodiments, a web server renders a version of a document in a form that is displayable by a client's web browser. The rendered version of the document comprises a plurality of named objects. The web browser bundles the named objects. In embodiments, the named objects are ordered in the anticipated order of access by a client's browser. For example, a word processing document may have named objects associated with a first page of the document followed by named objects associated with a second page of the document. The bundle also includes a manifest that describes the relative positions of the named objects within the bundle. In embodiments, the manifest is stored in a first section of the bundle. The bundle is stored in bundle storage, such as a network cache. In addition, the manifest may be provided to a client device.

When the web server receives a request from the client device for one or more named objects representing a particular portion of the rendered document, the server checks locally to see if the requested named object(s) are stored in a local cache. If not, the server accesses the bundle storage. The server may consult the manifest to determine which section, or "chunk," of the bundle contains the requested named object(s). In embodiments, the server requests and receives a chunk of the bundle containing the requested named object(s) and additional named objects. The requested named object(s) are sent to the client.

The web server obtains the entire chunk (rather than just the requested named object(s)) in anticipation that the browser running on the client will make further requests for named objects from the bundle. The chunk is stored locally, such as in an in-memory cache. Because, in embodiments, the named objects are ordered in the anticipated order of access by the browser, chances are increased that the next request for named object(s) from the browser may be served from the local storage, thereby reducing the number of required round trips to the bundle storage. In embodiments, the overhead cost of performing reads from bundle storage is thereby reduced.

The web server may be one of several web servers in a server farm fronted by a load balancing server. In such embodiments, the web server that sends the requested named object(s) to the client may employ techniques to ensure that future requests for named object(s) from the same bundle will be directed by the load balancing server to that web server. In addition, when the client obtains the manifest, the client may include in the request the relative positions of requested named object(s) within the bundle. This will allow any web server that receives the request to obtain the correct chunk from bundle storage (or local storage), even without access to the manifest.

Figure 1:
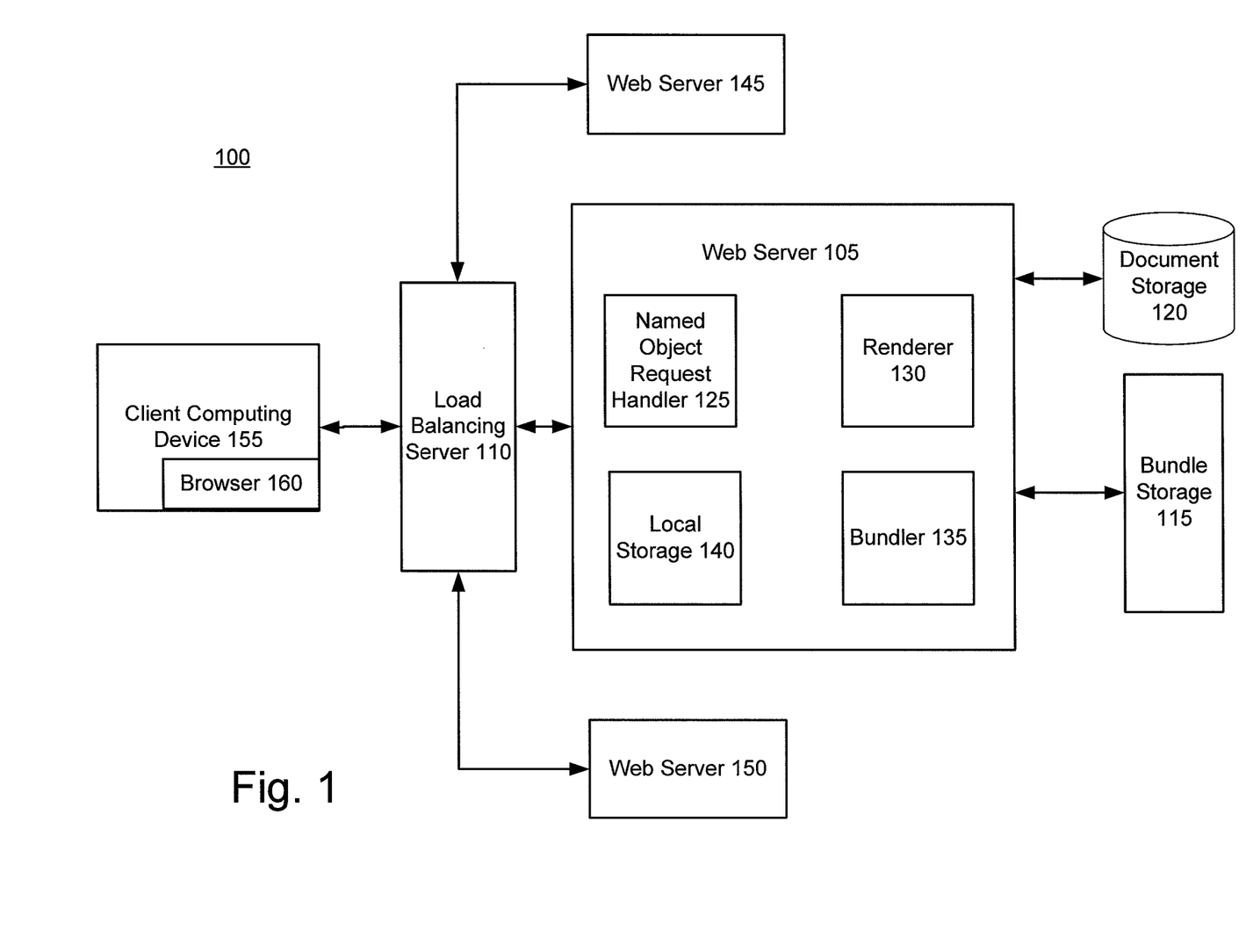
FIG. 1 is a block diagram illustrating an exemplary system for creating, storing, and providing web-viewable documents according to embodiments disclosed herein.

Referring now to the drawings, in which like numerals represent like elements through the several figures, aspects of disclosed embodiments and an exemplary operating environment will be described. FIG. 1 illustrates an embodiment of a system 100 for creating, storing, providing, and displaying web-viewable documents. System 100 includes a web server 105, operatively connected to a load balancing server 110, bundle storage 115, and document storage 120. As used herein, "operatively connected" includes any connection that permits different devices or systems to communicate with each other, whether directly or through intervening devices or systems. The web server 105 comprises a computing device that includes a named object request handler 125, renderer 130, bundler 135, and local storage 140. In embodiments, renderer 130, bundler 135, and named object request handler 125 may be implemented on different, operatively connected devices. In embodiments, local storage 140 may comprise in-memory cache, local disk storage, or other local storage media or devices. Additional web servers 145 and 150 may be comprised similarly to web server 105 and are also operatively connected to load balancing server 110 and (although not pictured) to bundle storage 115, and document storage 120. In addition, load balancing server 110 is operatively connected to a client computing device 155. Client computing device 155 may also include a browser 160, such as INTERNET EXPLORER, available from Microsoft Corporation of Redmond, Wash.

Computer systems described herein include, without limitation, a personal computer, server computer, hand-held or laptop device, microprocessor system, microprocessor-based system, programmable consumer electronics, network PCs, minicomputers, mainframe computer, smart card, telephone, mobile or cellular communication device, personal data assistant, distributed computing environment that includes any of the above systems or devices, and the like. Some computer systems described herein may comprise portable computing devices. Each computer system may also include one or more peripherals, including without limitation: keyboard, mouse, a camera, a web camera, a video camera, a display device such as a monitor, a microphone, or speakers. The term "computer system" is used herein interchangeably with "device."

Each computer system includes an operating system, such as (without limitation) the WINDOWS operating system from Microsoft Corporation of Redmond, Wash., and one or more programs (such as named object request handler 125, renderer 130, bundler 135, etc.) stored on the computer readable media. Each computer system may also include one or more input and output communications devices that allow the user to communicate with the computer system, as well as allow the computer system to communicate with other devices. Communications between and among the computer systems of FIG. 1 (e.g., web server 105, load balancing server 110, bundle storage 115, document storage 120, client computing device 155, web server 145 and web server 150) can be implemented using any type of communications link, including, without limitation, the Internet, wide area networks, intranets, Ethernets, direct-wired paths, satellites, infrared scans, Bluetooth, cellular communications, or any other type of wired or wireless communications.

Embodiments of the present application will now be described with respect to the system 100. Browser 160 may receive an indication that a user desires to view a document displayed by browser 160. The document may comprise, for example, a word processing document that includes text and images. Such indication may be caused by a user clicking on a link to the document. The browser 160 sends a request for the document, and the request is routed through load balancing server 110. Load balancing server 110 chooses a web server, such as web server 105, to respond to the request for the document.

The web server 105 determines whether the requested document has already been rendered into a version displayable by browser 160. For example, the web server 105 may check whether a rendered version is contained in local storage 140 or bundle storage 115. If not, the web server retrieves the requested document from document storage 120. Document storage 120 may comprise, for example, a back-end database where the requested word processing document is stored in its native form (e.g., Microsoft Word). Document storage 120 is operatively connected to the web server 105 and additional web servers 145 and 150. Once retrieved, the document is rendered by renderer 130 into a version that is viewable by browser 160. For example, renderer 130 may convert the document from Microsoft Word into hypertext markup language (HTML).

The document is rendered into a plurality of named objects. The rendered objects are "named" in that each is provided an identifier that a browser, such as browser 160, can use to request particular objects from web server 105. Named objects can include text, images, background frames, or other rendered pieces of content from the requested document. Once the named objects are rendered, web server 105 uses bundler 135 to bundle the named objects along with additional information, such as a bundle signature and a manifest.

Figure 2:
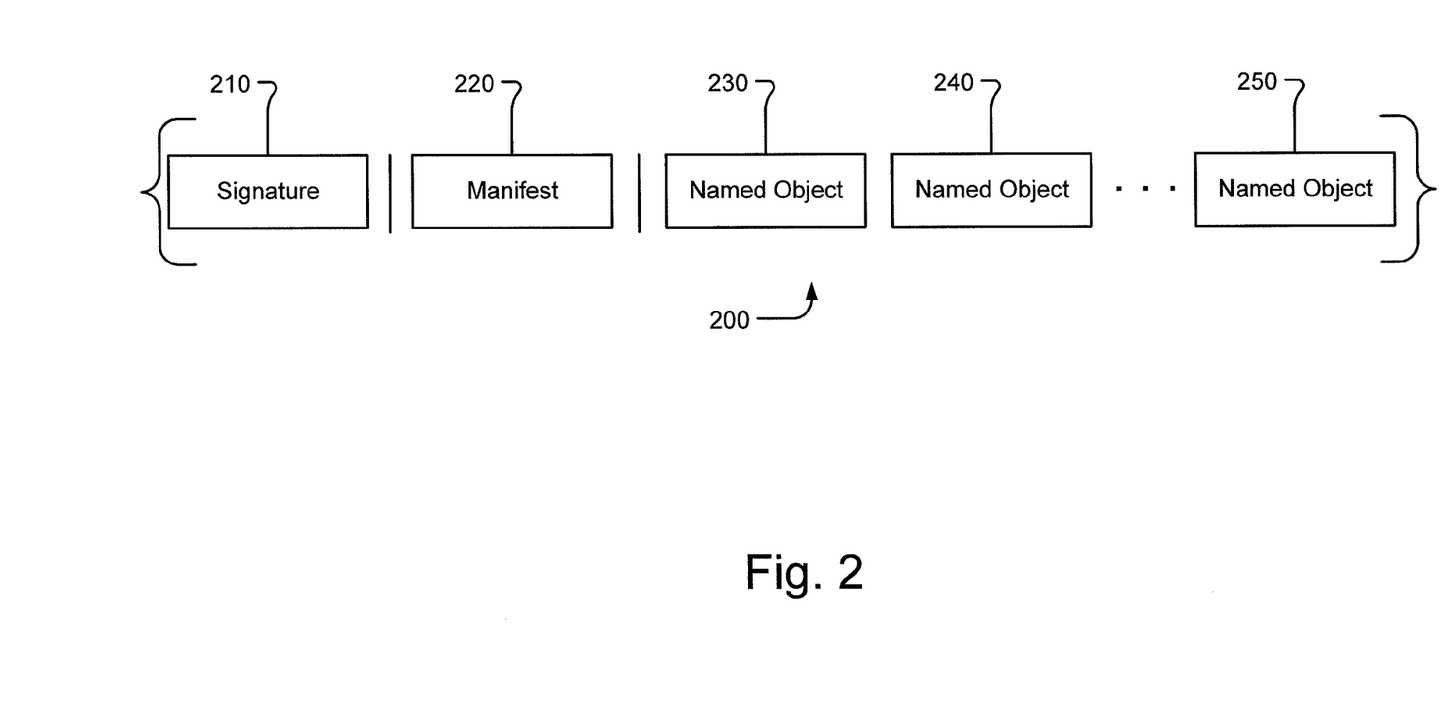
FIG. 2 illustrates an exemplary layout for a bundle used in embodiments disclosed herein.
Figure 3:
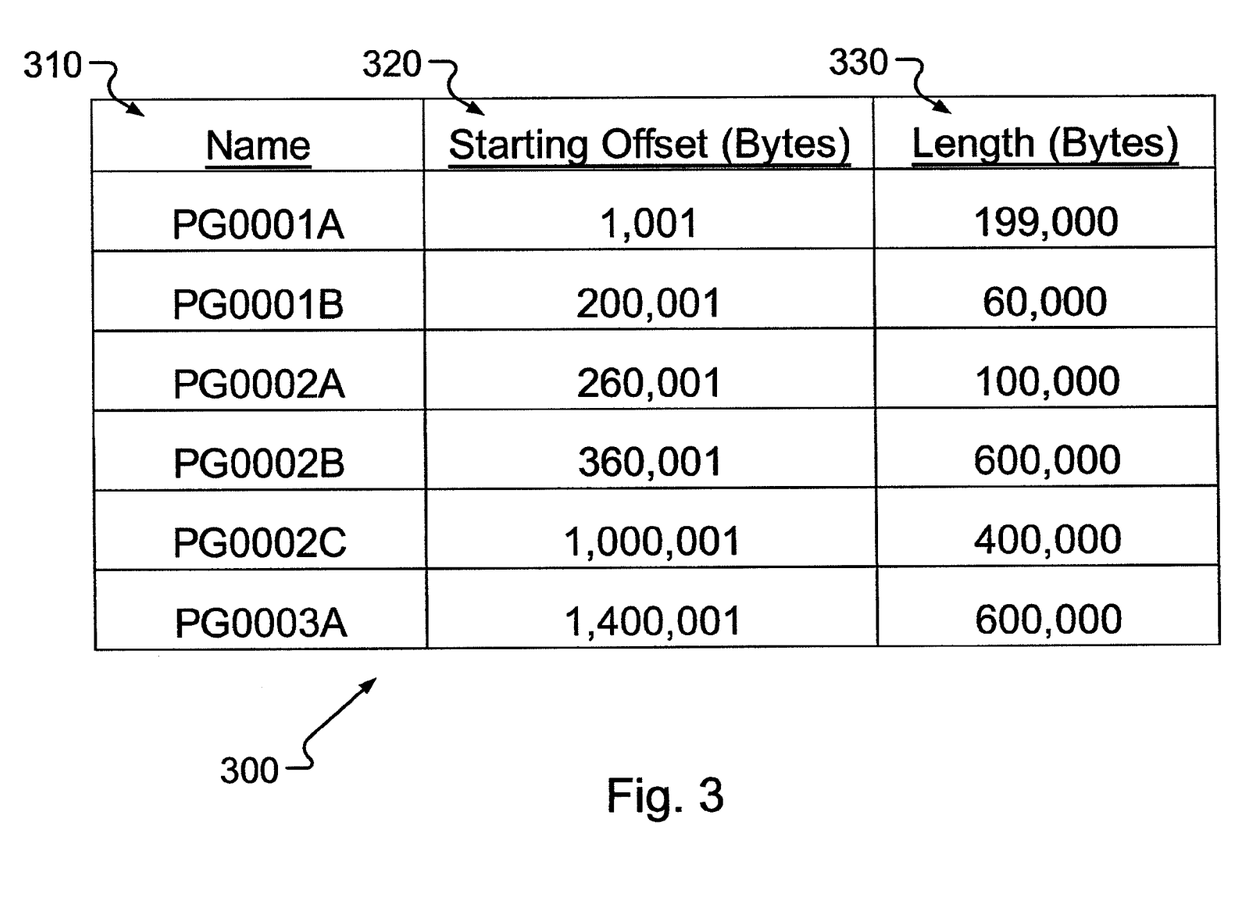
FIG. 3 illustrates an exemplary manifest used in embodiments disclosed herein.

FIG. 2 illustrates an exemplary embodiment of a layout for a bundle 200. The bundle 200 is a data structure that is headed by a signature 210 identifying the data structure as a bundle. Bundle 200 also includes a manifest 220. An example manifest 220 is illustrated in FIG. 3, discussed below. The manifest 220 may be used by web servers 105, 145, and 150 and client computing device 155 to determine in which part of the bundle 200 a particular named object was placed. Named objects 230, 240 and 250, in embodiments, are placed within the bundle 200 in an order of expected access by browser 160. For example, when the requested document is a word processing document, the objects may be ordered such that objects associated with the first page are followed by objects associated with the second page, etc.

Figure 4:
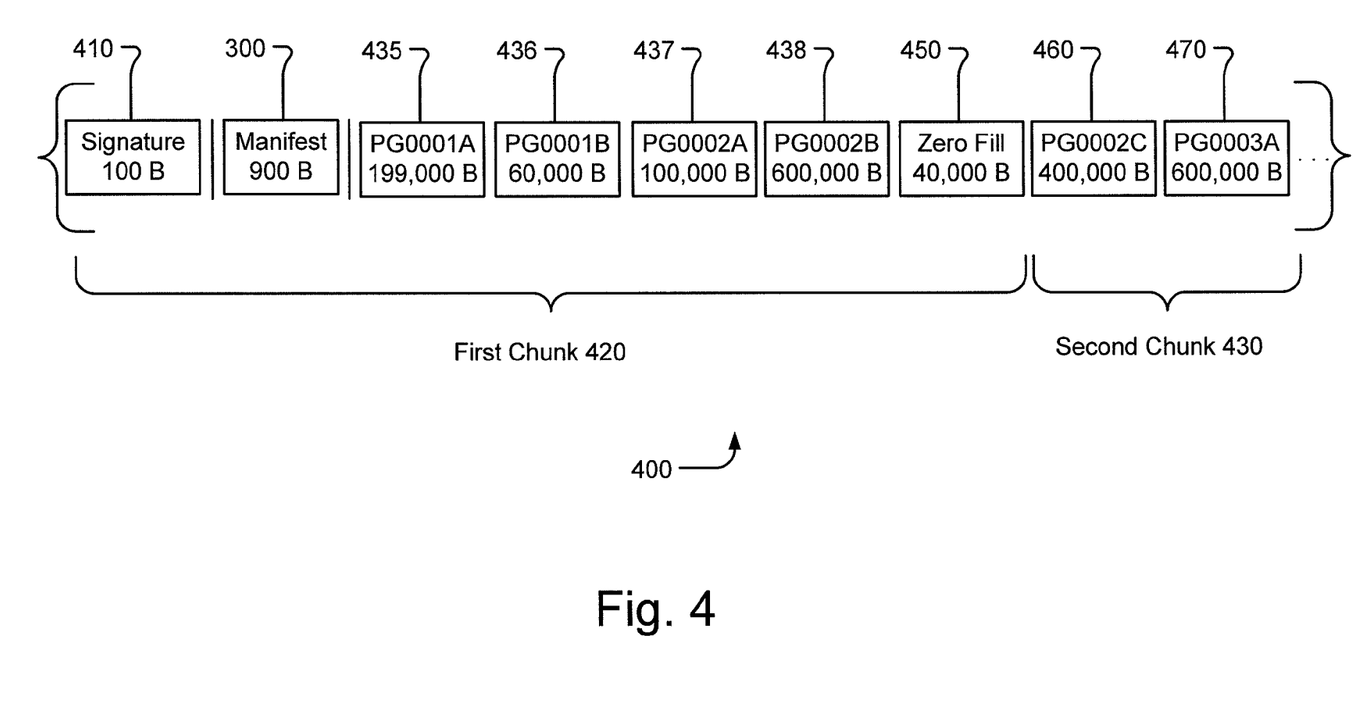
FIG. 4 illustrates an exemplary bundle used in embodiments disclosed herein.

Referring now to FIGS. 3 and 4, the manifest 300 shown in FIG. 3 includes information relating to the position and length of the named objects included in the example bundle 400 illustrated in FIG. 4. In the exemplary embodiment shown in FIG. 3, the manifest 300 includes, for each named object, the name 310, the starting offset 320, and the length 330 of the object. The object name 310 can take many forms and acts as an identifier for the object. The starting offset 320 identifies the starting byte count for the object within the bundle 400, and the length 330 identifies the total length of the object. Together, the name 310, offset 320, and length 330, in embodiments, describe the relative position of any object within the bundle 400.

For example, the manifest 300 indicates that named object PG0001B has a starting offset of 200,001 bytes and a length of 60,000 bytes. As shown in the bundle 400 in FIG. 4, the named object PG0001B is placed within the bundle 400 after the signature 410, the manifest 300, and named object PG0001A. Together, those three preceding elements of the bundle 400 total 200,000 bytes of information. Accordingly, object PG0001B starts at byte 200,001 and ends at byte 260,000 of the bundle 400. The information contained in the manifest can be used, for example, by server 105 and browser 160 to identify and request particular named objects from bundle storage 115 and local storage 140.

Referring back to FIG. 1, once the bundle is created by bundler 135, it is stored in bundle storage 115. In embodiments, bundle storage 115 comprises a network cache storage device or other storage device operatively connected to web servers 105, 145, and 150. Web server 105 may send to browser 160 the manifest from the bundle and certain named objects before storing the bundle at bundle storage 115. For example, web server may send to browser 160 the manifest and initial named objects related to the first page of the requested document even without receiving a specific request for those named objects from the browser 160. In addition, the web server 105 may store locally a first chunk of the created bundle in local storage 140 prior to storing the bundle at bundle storage 115. The first chunk of the created bundle may comprise, for example, the signature, manifest, and a first set of named objects. If the named objects are ordered in the bundle in an expected order of access by the browser 160, the named objects contained in the first chunk may comprise, for example, the named objects on the first page or pages of the requested document.

In embodiments, the web server 105 retrieves and stores chunks of the bundle that contain more named objects than are currently needed to satisfy a request from the browser 160. For example, even if the web server 105 sends to browser 160 initial named objects that are related only to the first page of the requested document, the web server 105 may store in local storage 140 a first chunk that includes named objects from the second page of the requested document as well. If and when the browser 160 then requests the named object(s) from the second page of the document, the web server 105 may be able to provide the requested named object(s) for the second page of the document from the local storage 140 without the additional overhead of accessing bundle storage 115. This can be particularly advantageous when the browser 160 is required to make several requests to the web server 105 in order to download each page of a document. For example, JavaScript is often used for browsers, and a limitation of many browsers' JavaScript implementations is that it requires each image used in a web page to be downloaded in a discrete request to the server. Since each page may contain several images, multiple requests per page may be required, and any overhead savings in satisfying such requests by the web server 105 will be accordingly magnified.

In embodiments, the web server 105 retrieves portions of a bundle from bundle storage 115 in equal sized chunks. Chunk size may be selected by an administrator of web server 105 or bundle storage 115. For example, the chunk size may be set to one-million bytes, as shown in relation to the bundle 400 of FIG. 4. The first chunk 420 is shown as including the first one-million bytes of the bundle 400, including the signature, 410, manifest 300, and named objects 435-438. The first chunk 420 may also include padding 450, such as a zero fill, in order to create a chunk that is exactly equal to the selected chunk size. This prevents any named object from being contained in two separate chunks (which would thereby require two accesses of the bundle storage 116 in order to retrieve such named object). For example, if zero fill 450 was not present in the first chunk 420, then named object 460 would span part of the first chunk 420 and second chunk 430. Any named objects exceeding the selected chunk size may still span multiple chunks within a bundle.

Optimizing the chunk size depends on a variety of factors, including, among others: the overhead incurred by web server 105 in accessing the bundle storage 115 versus local storage 140, the cost of employing a longer read from bundle storage 115 than is necessary to satisfy an individual request for named objects from browser 160, the size of local storage 140 and length of time a chunk is expected to remain in local storage 140, the size of the largest named object, and the likelihood that future requests from client computing device 155 for the document will be routed back to web server 105 by load balancing server 110. The sizes of the chunks and named objects shown in FIG. 4 are illustrative only. It will be appreciated that named objects may be larger or smaller depending upon the document and the capabilities of browser 160. For example, a chunk could include hundreds of named objects. If web server 105 is able to satisfy all of the requests for those named objects from local storage 140 while making only one read from bundle storage 115, performance will be improved significantly over having to access bundle storage to satisfy each individual request for named objects. On the other hand, if the chunk size is made too large, there is a risk that the user will not browse enough of the document to make a full chunk read from bundle storage 115 worthwhile. Accordingly, a determination of chunk size should balance the factors enumerated above.

Referring back to FIG. 1, when the web server 105, in embodiments, sends the manifest and initial named objects back to the browser 160, the web server 105 may indicate to the load balancing server 110 that future requests from client computing device 155 (or other client computing devices) for the requested document should be routed to the web server 105. For example, the web server 105 may include an identifier of web server 105 (such as a cookie including a globally unique identifier (GUID) value) in a message to browser 160 that includes the manifest and the initial named objects. Load balancing server 110 may maintain a table of documents, web servers, and web server identifiers such that, if a subsequent request from browser 160 for the document includes the cookie, web server 110 routes such subsequent request to the web server 105. Other schemes for attempting to route subsequent requests back to web server 105 are possible. By routing subsequent requests for the same document back to web server 105, it is more likely that web server 105 will be able to satisfy the request for named objects from a chunk that it has already stored in local storage 140. Because the overhead of accessing local storage 140 is generally lower than accessing bundle storage 115, system efficiency is improved.

When, in embodiments, the browser 160 receives the manifest from web server 105, the browser 160 can use the manifest to make subsequent requests for particular named objects, including the starting offset and length of such particular named objects. Among other benefits, this increases the efficiency of the web server receiving the request, even if it is not the same web server that provided the manifest to browser 160. For example, assume that the browser 160 received manifest 300 illustrated in FIG. 3. Manifest 300 describes the example bundle 400 illustrated in FIG. 4, and bundle 400 is assumed to have been stored in bundle storage 115. If browser 160 requests named object 460 (e.g., in response to a user's command to browse to a particular part of the document), the request can include the name of the object (PG0002C), starting offset within the bundle (1,000,001 bytes) and length (400,000 bytes). As discussed below, by including the name of the object, the starting offset, and the length of the named object in the request, the browser 160 makes it easier for a web server (such as web servers 105, 145 or 150) to fulfill the request.

If the browser 160 received a cookie identifying web server 105 has having provided the manifest 300 for the document, the browser 160 may include that cookie in the request for named object 460. The load balancing server 110 may then route the request for named object 460 to web server 105. Web server 105 will determine if the requested named object 460 is stored in local storage 140. If not, the web server 105 may request that the second chunk 430 in FIG. 4 be sent to the web server 105 from bundle storage 115. The second chunk 430 is then stored in local storage 140, and the named object 460 is returned to the browser 160. The presence of the starting offset and length of named object 460 in the request from the browser 160 improves this process in multiple ways.

First, in embodiments, web server 105 may not still have stored in local storage 140 the first chunk 420 that contains the manifest 300. The first chunk 420 may have been overwritten by other data in local storage 140 prior to receiving the request for named object 460. Accordingly, in order to locate the named object 460 within bundle 400, the web server 105 may otherwise have to retrieve both the first chunk 420 (to access the manifest 300) and then the second chunk 430 to obtain the named object 460. By providing within the request itself information about the relative position (e.g., starting offset and length) of the named object 460, the web server 105 is able to tailor its request to bundle storage 115 to a direct request for an exact byte range without having to refer to the manifest 300. In other embodiments, the request from the browser 160 does not include the relative position of the requested named object, and the web server refers to the manifest (either stored in local storage 140 or bundle storage 115) in order to determine the chunk needed to satisfy the request.

Second, even if the local storage 140 of web server 105 does still contain the first chunk 420 (and manifest 300), the load balancing server 110 may be unable to route the request for named object 460 to web server 105. This can occur where the web server 105 is offline or too busy to accommodate a request, the request from the browser 160 does not contain a cookie identifying web server 105, the load balancing server 110 is not functioning properly, or for other reasons. If the request for named object 460 is received, for whatever reason, by web server 145, the inclusion of the starting offset and length of named object 460 still improves this process. Since web server 145 will not likely have the manifest 300 in local storage, it would otherwise be required to download the first chunk 420 (and manifest 300) to determine that the named object 460 is contained in second chunk 430, which would then have to be downloaded to web server 145. Because the request from browser 160 includes the relative position of the named object 460 within the bundle 400, however, the web server 145 need not download the first chunk 420 with the manifest 300, and efficiency in satisfying the request for named object 460 is thereby improved.

Even if the relative position of the named object 460 is not included by browser 160 in its request, the web server (e.g., web server 105) can use the manifest to determine which chunk of the bundle 400 needs to be retrieved in order to satisfy the request. If the first chunk 420, including manifest 300, is still present in local storage 140, then the web server 105 can determine in which chunk named object 460 is present without accessing bundle storage 115. Accordingly, the present system is robust even if the load balancing server fails to route a second request for named object to the same web server, the browser fails to include the relative position of the named object within the bundle, or the web server no longer has the manifest in local storage.

Figure 5:
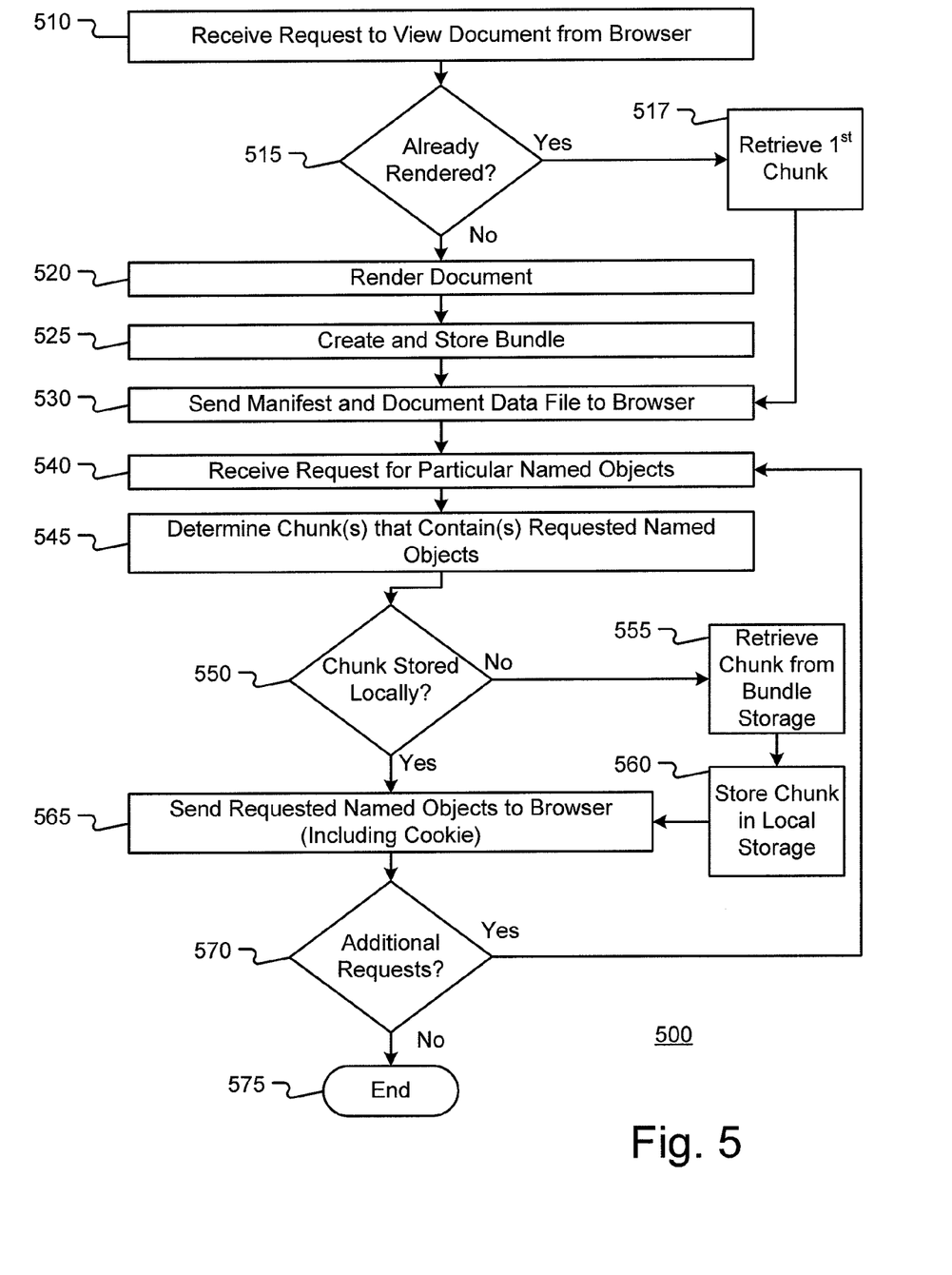
FIG. 5 illustrates an exemplary process for creating, storing, and providing web-viewable documents to a browser according to embodiments disclosed herein.
Figure 6:
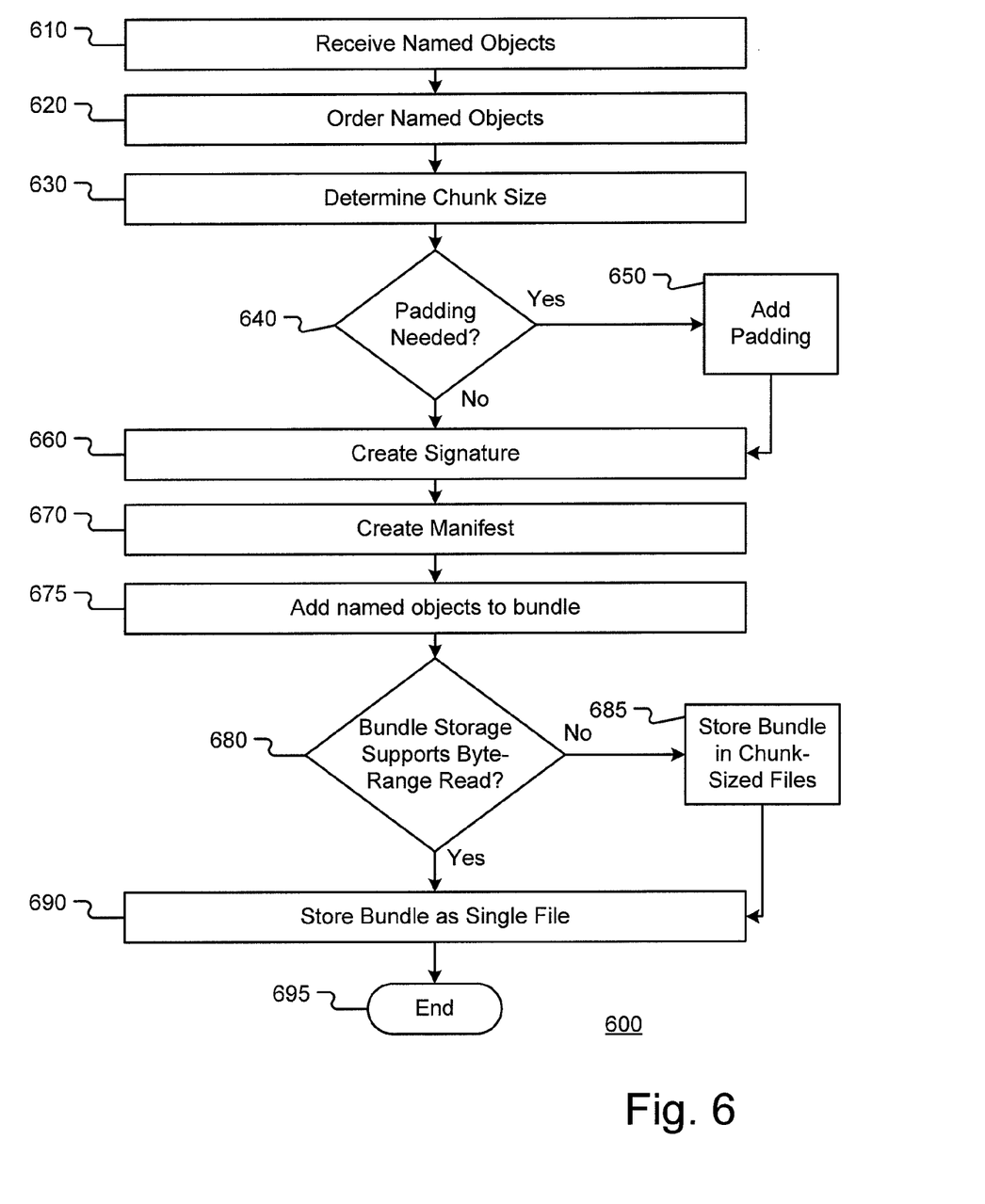
FIG. 6 illustrates an exemplary process for creating and storing bundles according to embodiments disclosed herein.
Figure 7:
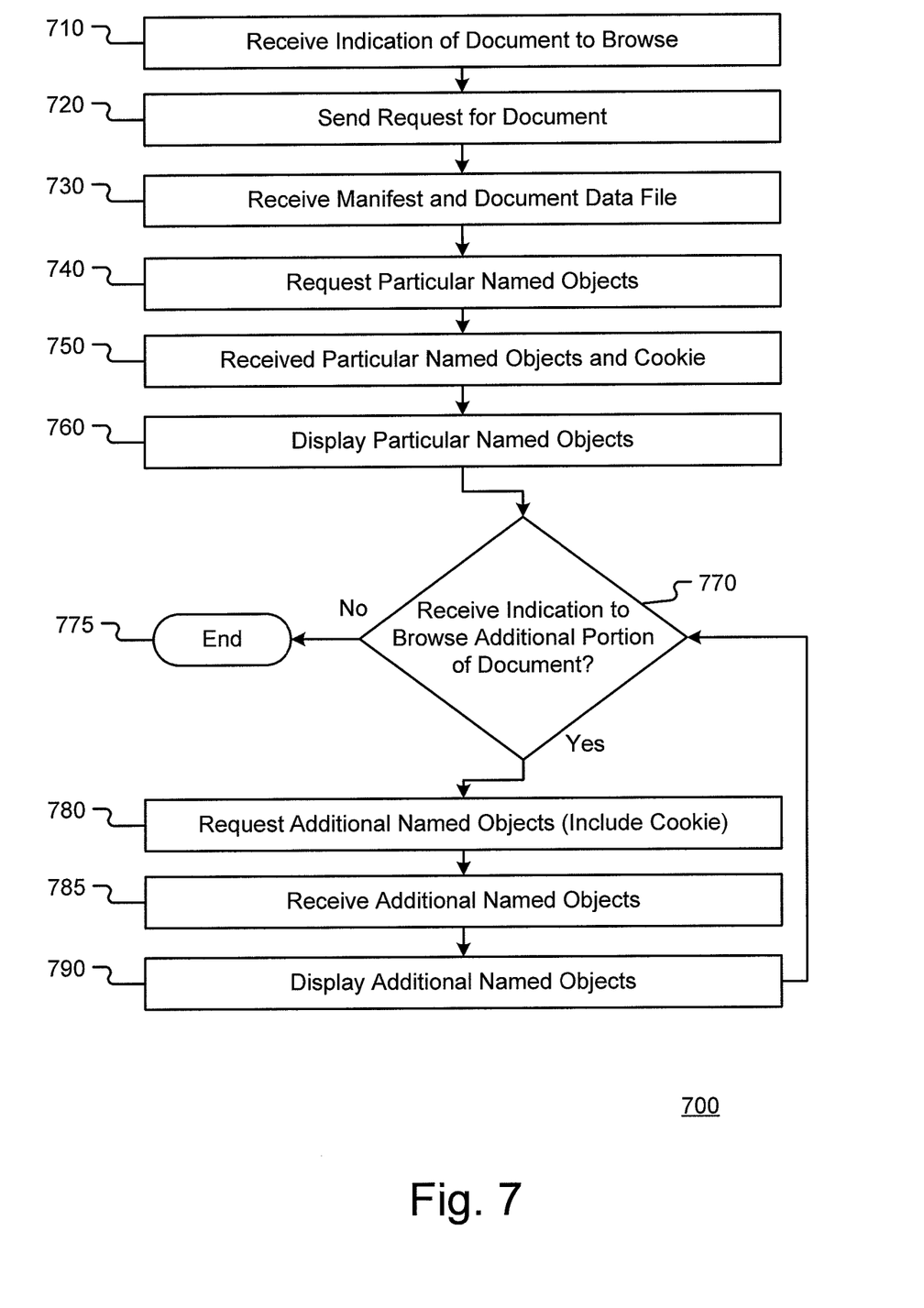
FIG. 7 illustrates an exemplary process for requesting, receiving, and displaying documents at a client according to embodiments disclosed herein.

Referring now to FIGS. 5-7, the steps illustrated in FIGS. 5-7 are exemplary only. In embodiments, other steps may be performed, the steps shown may be combined and/or performed in a different order, or steps may be omitted altogether. FIG. 5 illustrates an exemplary process for creating, storing, and providing web-viewable documents to a browser according to embodiments disclosed herein. In embodiments, the process described in FIG. 5 may be executed by a system such as system 100 in FIG. 1. At step 510, a request to view a document is received from a browser operating on a client machine. It is determined 515 whether the document has already been rendered. For example, it may be determined whether a bundle of named objects for the document is stored in an accessible location. If the document has already been rendered, a first chunk of the document that includes the manifest is retrieved 517. The retrieval of the first chunk of the document may be made from a local storage or from external bundle storage. If the document has not already been rendered, the document is rendered 520 into a version that can be displayed by a browser, and a bundle for the document is created and stored 525. An exemplary process for creating and storing the bundle is discussed separately in relation to FIG. 6.

The process then continues to step 530, where the manifest and a document data file are sent to the browser. The document data file includes information for viewing the document and information from which a browser receiving the document data file can derive the names of objects in the bundle corresponding to the manifest. In addition, in embodiments, the web server also sends to the browser software code, such as JavaScript code, that when executed by the browser, permits the browser to understand the structure of the document data file and provides a method for the browser to request particular named objects from the web server. As discussed above, the manifest may include the names of the objects that comprise a rendered version document and the relative positions of the named objects within the bundle. Optionally, initial named objects can be sent 535 to the browser along with the manifest and document data file. Sending initial named objects (such as named objects representing the first page of the document) can improve the experience of a user of the browser by cutting the time it takes for the first page of a document to be displayed by the browser. In other embodiments, initial named objects are sent to the browser even before the bundle and the manifest are created and stored. In embodiments, the document data file is sent while the bundle and manifest are being created. Since all of the named objects may be temporarily stored by the web server (or a rendering server known, and operatively connected, to the web server) while the bundle is created, those requests for named objects can be satisfied by the web server prior to the bundle being completely processed and stored in bundle storage.

Once the bundle and manifest are created, the process proceeds to step 540, in which a request for a particular named object is received. At step 545, it is determined which chunk(s) of the bundle contain(s) the requested named object. As discussed above, this can be accomplished in a variety of ways. For example, in embodiments where the manifest is sent to the browser, the browser can use the manifest to include in its request the relative position of the particular named object in the bundle. Alternatively, a web server may retrieve the manifest from local storage or bundle storage in order to determine which chunk(s) are needed to satisfy the request for the particular named object. Other manners of accomplishing step 545 are also possible.

It is then determined 550 whether the chunk(s) determined to be necessary are contained in local storage, such as in-memory cache or local disk storage. If not, the necessary chunk(s) are retrieved 555 from bundle storage, and the retrieved chunk(s) are stored 560 in local storage. As discussed, the size of the chunk(s) retrieved and stored in steps 555 and 560 may include additional named objects, beyond the particular named object requested. This increases the chances that a subsequent request for named objects may be satisfied from chunks stored locally rather than requiring retrieval from bundle storage.

If the chunk(s) containing the particular named object requested are stored locally (or after the necessary chunk(s) are retrieved from bundle storage), the requested particular named object is sent 565 to the browser. As discussed, in embodiments, a cookie identifying a web server sending the particular named object is included. This permits a load balancing server to route future requests for the document from the browser to the same web server. It is then determined 570 whether additional requests for named objects have been received. If so, the process returns to step 545, where it is determined which chunk(s) of the bundle contain the requested named object(s). If not, the process ends 575.

FIG. 6 illustrates a process 600 for creating and storing a bundle for a rendered version of a document. The exemplary process begins by receiving 610 named objects. In embodiments, named objects can be created as the result of rendering a document from its native form into a version displayable by a browser. The named objects are then ordered 620. As discussed, the named objects may be ordered within the bundle in a sequence of expected access by a browser. For example, in a word processing document, an assumption may be made that a user of a browser will page through the document in order of the pages (e.g., reviewing the first page, then the second page, etc.). By ordering named objects within the bundle in this way, the chances are increased that a chunk of the bundle retrieved to satisfy a request for particular named objects will also contain the named objects next requested by the browser. In embodiments, the steps 610 and 620 can be combined. For example, a bundler may receive from a renderer the named objects already in the order in which they are to be bundled.

The process continues to step 630, in which a chunk size is determined. The chunk size may be automatically determined or may be set based on input received from a user, such as an administrator. As discussed, chunk size may be optimized based upon a variety of factors, including, among others: the overhead incurred by a web server in accessing bundle storage versus local storage, the cost of employing a longer read from a bundle storage than is necessary to satisfy an individual request for named objects from browser, the size of local storage and length of time a chunk is expected to remain in local storage, the size of the largest named object, and the likelihood that future requests from client computing device for the document will be routed back to the web server by a load balancing server.

Next it is determined 640 whether padding is needed between named objects. As discussed, padding (such as zero fill 450 shown in FIG. 4) may be used between named objects to prevent named objects from spanning across two chunks. For example, if the chunk size determined in step 630 is determined to be one-million bytes, padding may be added after particular named objects such that each successive one-million bytes chunk (after the first chunk) begins with the first byte of a named object. In this manner, a situation is avoided in which a web browser is required to download two chunks from bundle storage in order to obtain a single named object. In embodiments, chunk size is set to be larger than the largest named object so that the advantage of padding can be fully realized. If padding is needed, it is added 650 between named objects, and the process moves to step 660.

At step 660, a signature is created and added to the bundle. The signature can comprise any form that identifies the bundle and signals to any device or process receiving the bundle that the contents of the bundle are arranged in an expected manner. At step 670 a manifest is created, such as the manifest 300 illustrated in FIG. 3. As discussed, the manifest describes the relative positions of the named objects within the bundle. In embodiments, the manifest is stored within the first chunk of the bundle. At step 675, the named objects are added to the bundle, and the creation of the bundles is effectively completed.

At step 680 it is determined whether the bundle storage where the bundle is to be stored supports the ability to read a specific byte range. In embodiments, the manner in which the bundle is written to bundle storage may vary depending on whether a specific byte range read is permitted by the bundle storage. If the specific byte range read is not supported by the bundle storage, the bundle may be stored 685 in sequential files, wherein each file is the size of the chunk size determined in step 630. This permits a web server to later read an entire file from the bundle storage and still only receive the desired chunk. In this embodiment, the request from the web server to the bundle store may include the file name of the first chunk and include the starting offset and length of the desired chunk. The bundle store may be programmed to determine which of the stored files contains that chunk. If specific byte range reads are supported by the bundle storage, the bundle may be stored 690 as a single file in the bundle storage. Other mechanisms for storing the bundle within the bundle storage are also possible. Once the bundle is stored, the process ends 695.

FIG. 7 illustrates and exemplary process 700 for requesting, receiving, and displaying documents at a client according to embodiments disclosed herein. At step 710 and indication of a document to browse is received at the client. For example, a user may open a browser operating on the client and click on a link to the desired document. A request for the desired document is then sent 720. For example, the browser may send a request to the URL indicated by the link clicked on by the user. In embodiments, in response to the request the client receives 730 a manifest for the desired document and a document data file. In embodiments, the client may also receive software code, such as JavaScript code, that when executed by the client permits the client to understand the document data file and provides a method for the client to request particular named objects. The document data file includes information for viewing the document and information from which a browser receiving the document data file can derive the names of objects in the bundle corresponding to the manifest. As discussed, the manifest details the names of the named objects contained in the document and their relative positions within the bundle in which the named objects are stored.

A request is then made 740 for particular named objects. For example, the browser may send a request to the URL indicated by the link clicked on by the user. The request may be generated in response to an indication from a user that the user desires to view a particular portion of the document. Using, for example, the document data file received at step 730, a browser may determine the names of objects corresponding to the portion of the document the user wishes to view. In addition to the names of the desired objects, the request may include other information derived from the manifest. For example, in embodiments, the request may include the relative position(s) (e.g., starting offset and length) of the named object(s) within the bundle. As discussed, this permits any web server that is assigned the request by a load balancing server to satisfy the request for the named objects without access to the manifest.

At step 750, the requested named objects are received. In embodiments, the named objects are accompanied by a cookie identifying the web server that sent the named objects. Once the requested named objects are received, they are displayed 760. For example, a browser may display the objects on a monitor communicatively coupled to the client.

Next, it is determined whether a request has been received to browse an additional portion of the document. If not, the process ends 775. If so, the process continues, and a request is generated for the named objects representing the additional requested portion of the document. For example, the browser may receive an indication from a user (through mouse click, keystroke, or otherwise) that the user desires to see the next page of a document. The browser may then generate a request for the named objects corresponding to that page or portion of that page (such as the request described with respect to step 740). In embodiments, the request may include the cookie received in step 750. By including the cookie in the request, a load balancing server can direct the request to the same web server that satisfied the previous request, thereby increasing the chance that the web server will have the chunk of the bundle necessary to satisfy the request still stored in local storage. Once the additional requested named objects are received 785, they are displayed 790, and the process returns to step 770.

Figure 8:
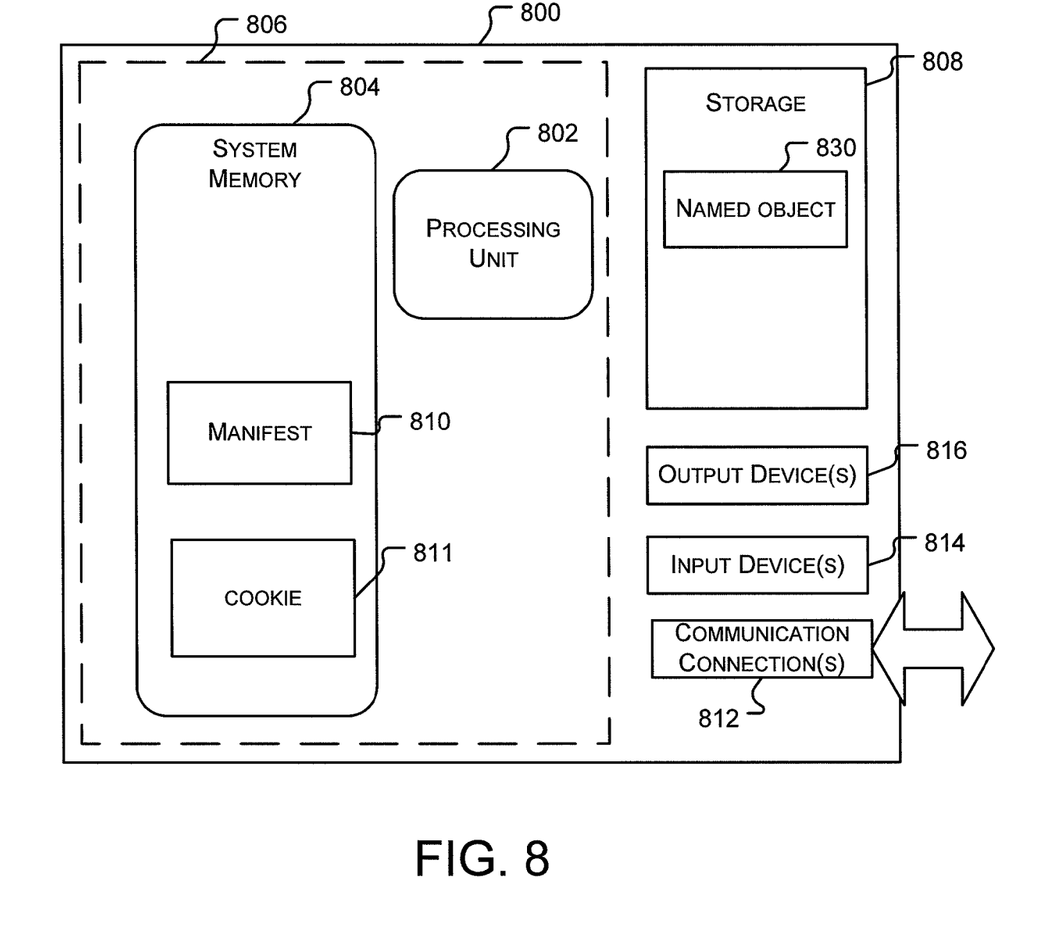
FIG. 8 illustrates a general computing device that can be used to implement the embodiments described herein.

FIG. 8 illustrates a general computing device 800 (also referred to herein as a device, computer or computer system), which can be used to implement the embodiments described herein. The computing device 800 is only one example of a computing environment and is not intended to suggest any limitation as to the scope of use or functionality of the computer and network architectures. Neither should the computing device 800 be interpreted as having any dependency or requirement relating to any one or combination of components illustrated in the example computing device 800. In embodiments, computing device 800 may be used, for example, as web servers 105, 145 or 150, load balancing server 110, client computing device 155, etc., as described above with respect to FIG. 1.

In its most basic configuration, computing device 800 typically includes at least one processing unit 802 and memory 804. Depending on the exact configuration and type of computing device, memory 804 may be volatile (such as RAM), non-volatile (such as ROM, flash memory, etc.) or some combination of the two. This most basic configuration is illustrated in FIG. 8 by dashed line 806. System memory 804 stores applications that are executing on computing device 800. In addition to applications, memory 804 may also store information being used in operations being performed by computing device 800, such as a manifest 810 and/or a cookie 811, as described with respect to FIGS. 1-7.

Additionally, computing device 800 may also have additional features/functionality. For example, computing device 800 may also include additional storage 808 (removable and/or non-removable) including, but not limited to, magnetic or optical disks or tape. Such additional storage is illustrated in FIG. 8 by storage 808. Computer storage media includes volatile and nonvolatile, removable and non-removable media implemented in any method or technology for storage of information such as computer readable instructions, data structures, program modules or other data. Memory 804 and storage 808 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

As those with skill in the art will appreciate, storage 808 may store a variety of information. Among other types of information, storage 808 may store named object 830. Computing device 800 may also contain communications connection(s) 812 that allow the system to communicate with other devices. Communications connection(s) 812 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

Computing device 800 may also have input device(s) 814 such as keyboard, mouse, pen, voice input device, touch input device, etc. Output device(s) 816 such as a display, speakers, printer, etc. may also be included. All these devices are well know in the art and need not be discussed at length here.

Although the subject matter has been described in language specific to structural features and/or methodological acts, it is to be understood that the subject matter defined in the appended claims is not necessarily limited to the specific features or acts described above. For example, it should be appreciated that, although certain embodiments herein are described with respect to a client-browser, document-viewing environment, the principles described herein have application beyond the provision of documents to browsers operating on a client machine. For example, the named objects described herein could comprise any related set of resources that can be stored in a bundle. In addition, a client requesting such named objects could comprise any client machine or application, not simply a client running a browser. The scope of the present application is thus not limited to the browser/document-viewing environment. Rather, the specific features and acts described above are disclosed as example forms of implementing the claims.

I claim:

1. A method for providing a document to a client computing device, comprising the following steps:
   sending, by a server to the client computing device, a manifest, the manifest including location information of at least one particular named object in a bundle that includes a plurality of named objects, wherein the location information indicates that the at least one particular named object is contained in a particular chunk of a plurality of chunks of the bundle;
   receiving, at the server, a request from the client computing device for the at least one particular named object representing a portion of a document, wherein the request from the client computing device identifies the particular chunk;
   determining that the at least one particular named object is contained in the particular chunk of the bundle, wherein the bundle includes the plurality of named objects that comprise a version of the document rendered so that the document is displayable by the client computing device;
   determining that the particular chunk is not stored locally at the server;
   requesting the particular chunk from a bundle storage;
   receiving the particular chunk from the bundle storage;
   storing the particular chunk locally at the server, wherein the particular chunk of the bundle comprises the at least one particular named object and additional named objects; and
   sending the at least one particular named object and the manifest to the client computing device without sending the additional objects to the client computing device.

2. The method of claim 1, further comprising:
   receiving at the server a request from the client computing device for a second named object;
   determining that the second named object is contained in the particular chunk;
   retrieving the second named object from local storage at the server;
   sending the second named object to the client computing device.

3. The method of claim 1, further comprising:
   receiving from the client computing device at the server a request for a second named object;
   determining that the second named object is contained in a second chunk of the bundle;
   requesting the second chunk from the bundle storage;
   receiving the second chunk from the bundle storage;
   storing the second chunk locally at the server, wherein the second chunk of the bundle comprises the second named object and third named objects;
   sending to the client computing device the second named object without sending the third named objects.

4. The method of claim 1, further comprising:
   sending a manifest to the client computing device from the server, wherein the manifest describes relative positions of the plurality of named objects within the bundle.

5. The method of claim 4, wherein the request from the client computing device contains the relative position of the at least one particular named object within the bundle.

6. The method of claim 1, further comprising:
   sending to the client computing device an identifier of the server;
   receiving a request for a second named object, wherein the request includes the identifier of the server.

7. The method of claim 6, further comprising:
   sending a manifest to the client computing device from the server, wherein the manifest describes relative positions of the plurality of named objects within the bundle.

8. A system for providing a document to a browser operating on a client computing device, the system comprising:
   at least one processor;
   at least one computer storage medium, wherein the at least one computer storage medium stores computer-executable instructions that, when executed by the at least one processor, cause the at least one processor to perform a method comprising the following steps:
      rendering a document into a version that is displayable by a browser on a client computing device, wherein the version comprises a plurality of named objects;
      creating a bundle, wherein the bundle comprises the plurality of named objects and a manifest that describes relative positions of the named objects within the bundle;
      sending the bundle to a bundle storage;
      sending, to the client computing device, the manifest;
      receiving a request from the client computing device for at least one particular named object representing a portion of a document, wherein the request identifies a particular chunk in which the at least one particular named object is contained;

determining that the at least one particular named object is contained in the particular chunk of the bundle;

determining that the particular chunk is not stored locally in the at least one computer storage medium;

requesting the particular chunk from the bundle storage;

storing the particular chunk locally in the at least one computer storage medium, wherein the particular chunk comprises the at least one particular named object and additional named objects; and sending the at least one particular named object to the browser without sending the additional objects to the browser.

9. The system of claim 8, wherein the method further comprises, after creating the bundle:

sending the manifest to the browser; and receiving a request for the at least one particular named object, wherein the request for the at least one particular named object includes the relative position of the at least one particular named object within the bundle.

10. The system of claim 8, wherein the method further comprises, after rendering the document:

sending initial named objects to the browser prior to sending the bundle to the bundle storage.

11. The system of claim 8, wherein the method further comprises:

sending to the browser an identifier of a first web server;

receiving a request for a second named object, wherein the request includes the identifier of the first web server.

12. The system of claim 11, wherein the system further comprises:

a load-balancing server, operatively connected to the first web server;

a second web server, operatively connected to the load-balancing server;

wherein the load-balancing server is adapted to receive the request for the second named object, recognize the identifier, and forward the request for the second named object to the first web server.

13. The system of claim 8, wherein the step of creating the bundle comprises ordering the plurality of named objects within the bundle in an order of expected access by the browser.

14. The system of claim 8, wherein the step of creating the bundle comprises:

determining a chunk size;

for any of the plurality of named objects that is smaller than the chunk size, placing the named objects into the bundle such that each named object is contained wholly within one chunk of the bundle.

15. The system of claim 14, wherein the bundle includes a first chunk and a second chunk and the step of creating the bundle comprises padding the first chunk with information other than named objects so that the first chunk equals the determined chunk size.

16. The system of claim 8, wherein the method further comprises:

receiving a request from the browser for a second named object;

determining that the second named object is contained in the particular chunk;

retrieving the second named object from local storage at the first server;

sending the second named object to the browser.

17. The system of claim 8, wherein the method further comprises:

receiving from the browser at a first server a request for a second named object;

determining that the second named object is contained in a second chunk of the bundle;

requesting the second chunk from the bundle storage;

receiving the second chunk from the bundle storage;

storing the second chunk locally at the first server, wherein the second chunk of the bundle comprises the second named object and third named objects;

sending to the browser the second named object without sending the third named objects.

18. The system of claim 17, wherein the step of creating the bundle comprises padding the first chunk with information other than named objects so that the first chunk equals the determined chunk size.

19. A computer storage medium of a client device containing computer-executable instructions that, when executed by at least one processor, perform the following steps:

receiving a manifest associated with a document, wherein the manifest describes relative positions of a plurality of named objects within a plurality of chunks of a bundle associated with the document;

sending from the client device a request for at least one particular named object representing a portion of the document;

receiving at the client device the at least one particular named object;

wherein the at least one particular named object and additional named objects comprise a version of the document rendered to be displayable on a browser operating on the client device;

and wherein the request for the at least one particular named object includes the relative position of the at least one particular named object within the bundle by identifying a particular chunk of the plurality of chunks in which the at least one particular named object is contained; and displaying the at least one particular named object.

20. The computer storage medium of claim 19, wherein the step of receiving the at least one particular named object includes receiving an identifier of a server device and further comprising the step of:

requesting a second named object, wherein the request for the second named object includes the identifier of the server device.

* * * * *